(12) United States Patent
Rusche

(10) Patent No.: US 9,494,055 B2
(45) Date of Patent: Nov. 15, 2016

(54) EXHAUST HEAT UTILISATION DEVICE

(75) Inventor: Ulrich Rusche, Werl-Büderich (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 413 days.

(21) Appl. No.: 13/474,173

(22) Filed: May 17, 2012

(65) Prior Publication Data

US 2012/0291418 A1    Nov. 22, 2012

(30) Foreign Application Priority Data

May 18, 2011 (DE) .................. 10 2011 076 054

(51) Int. Cl.
    *F01K 23/10* (2006.01)
    *F01N 5/02* (2006.01)
    (Continued)

(52) U.S. Cl.
    CPC ............ *F01K 23/065* (2013.01); *F01K 3/10* (2013.01); *F01K 15/02* (2013.01); *F01N 5/02* (2013.01); *F28D 20/00* (2013.01); *F28D 21/0003* (2013.01); *F02G 5/02* (2013.01); *Y02E 60/142* (2013.01); *Y02T 10/16* (2013.01); *Y02T 10/166* (2013.01)

(58) Field of Classification Search
    CPC .......... F01K 15/02; F01K 23/065; F01K 3/10; F01N 5/02; F28D 20/00; F28D
    (Continued)

(56) References Cited

U.S. PATENT DOCUMENTS

2002/0014329 A1* 2/2002 Carr ................ B60H 1/005
                                              165/201
2010/0043413 A1* 2/2010 Orihashi et al. .............. 60/320
(Continued)

FOREIGN PATENT DOCUMENTS

DE    102006043139 A1    3/2008
DE    202008002781 U1    8/2008
(Continued)

OTHER PUBLICATIONS

Machine Translation of DE 102007033611 A1.*
Machine Translation of JP2007032561.*
Machine Translation of DE102009035522.*

*Primary Examiner* — Kenneth Bomberg
*Assistant Examiner* — Brandon Lee
(74) *Attorney, Agent, or Firm* — Reinhart Boerner Van Deuren P.C.

(57) ABSTRACT

The invention provides an exhaust heat utilization device for a combustion engine with an exhaust heat utilization circuit, in which a working medium circulates. An evaporator is arranged in the exhaust heat utilization circuit for evaporating the working medium, which can be supplied with exhaust gas of the combustion engine, with an expansion machine arranged in the exhaust heat utilization circuit downstream of the evaporator for expanding the working medium. A condenser is arranged in the exhaust heat utilization circuit downstream of the expansion machine for condensing the working medium. A delivery device is arranged in the exhaust heat utilization circuit downstream of the condenser for driving the working medium in the exhaust heat utilization circuit and with a heat storage unit. The device is given an improved functionality when the heat storage unit is incorporated in the exhaust heat utilization circuit and can be supplied with working medium.

10 Claims, 3 Drawing Sheets

(51) Int. Cl.
  *F01K 23/06*    (2006.01)
  *F01K 15/02*    (2006.01)
  *F01K 3/10*     (2006.01)
  *F28D 20/00*    (2006.01)
  *F28D 21/00*    (2006.01)
  *F02G 5/02*     (2006.01)

(58) Field of Classification Search
  CPC ............... 21/0003;F02G 5/02; Y02E 60/142;
                     Y02T 10/16; Y02T 10/166
  USPC .......................................... 60/274, 320, 324
  See application file for complete search history.

(56) References Cited

U.S. PATENT DOCUMENTS

2011/0088671 A1* 4/2011 Johnson .................. 123/568.12
2011/0185726 A1* 8/2011 Burns et al. .................... 60/618

FOREIGN PATENT DOCUMENTS

| | | |
|---|---|---|
| DE | 10 2007 033 611 A1 | 1/2009 |
| DE | 102009035522 A1 | 2/2011 |
| EP | 2660432 A1 | 11/2013 |
| JP | 62167811 U | 10/1987 |
| JP | 08-319805 A | 12/1996 |
| JP | 10-121946 A | 5/1998 |
| JP | 2002-115506 A | 4/2002 |
| JP | 2005016326 A | 1/2005 |
| JP | 2007-032561 A | 2/2007 |
| JP | 2009-185773 A | 8/2009 |
| JP | 2009-191624 A | 8/2009 |
| JP | 2010-112198 A | 5/2010 |
| JP | 2010116911 A | 5/2010 |
| JP | 2011-240735 A | 12/2011 |
| WO | WO 2011037596 A1 * | 3/2011 |

* cited by examiner

EXHAUST HEAT UTILISATION DEVICE

CROSS-REFERENCE TO RELATED PATENT APPLICATIONS

This patent application claims priority to German Patent Application No. 102011076054.7, filed May 18, 2011, the entire teachings and disclosure of which are incorporated herein by reference thereto.

FIELD OF THE INVENTION

The present invention relates to an exhaust heat utilisation device for a combustion engine, in particular of a motor vehicle, having the features of the preamble of Claim 1. In addition, the invention relates to an associated operating method.

BACKGROUND OF THE INVENTION

From DE 10 2007 033 611 A1 an exhaust heat utilisation device is known. This comprises an exhaust heat utilisation circuit, in which a working medium circulates. In the flow direction of the working medium, an evaporator for evaporating the working medium, which can be supplied with waste gas of the combustion engine, an expansion machine for expanding the working medium, a condenser for condensing the working medium and a delivery device for driving the working medium are arranged one after the other in the exhaust heat utilisation circuit. In addition, a heat storage unit, which is incorporated in an exhaust gas path leading to the evaporator, is provided with the known exhaust heat utilisation device. With the help of a valve device, the exhaust gas flow can be divided over the heat storage unit and over the evaporator dependent on a value representing the available heat energy of the exhaust gas. For example, the evaporator is supplied with exhaust gas as a matter of principle. If more exhaust gas heat is available than is required for the evaporation, an exhaust gas part flow can be fed to the heat storage unit. If, by contrast, less exhaust gas heat is available than required for the evaporation and if the temperature of the heat storage unit is higher than the temperature of the exhaust gas, the exhaust gas flow can be initially conducted through the heat storage unit and subsequently to the evaporator. With the known exhaust heat utilisation device, a heat storage unit incorporated in the exhaust system of the combustion engine is thus used for pre-heating the exhaust gas as a function of demand.

The present invention deals with the problem of stating an improved or at least another embodiment for an exhaust heat utilisation device of the type mentioned at the outset, which is characterized in particular by a practical value or by an additional functionality of the exhaust heat utilisation circuit. Additionally or alternatively, the energetic efficiency of the combustion engine equipped with the exhaust heat utilisation device is to be increased.

BRIEF SUMMARY OF THE INVENTION

According to the invention, this problem is solved through the subjects of the independent claims. Advantageous embodiments are the subject of the dependent claims.

Embodiments of the invention are based on the general idea of making available the heat capacity of the exhaust heat utilisation circuit to the exhaust gas line, if the exhaust gas line has a heat requirement phase, i.e. an operating phase with an increased heat requirement. Such heat requirement phases are present for example during a cold starting phase of the combustion engine or during interruption times of the engine operation, in particular with hybrid applications, or with operating states of the combustion engine with low engine load or with a stop and go operation. To this end, embodiments of the invention propose incorporating a heat storage unit in the exhaust heat utilisation circuit in such a manner that it can be supplied with the working medium of the exhaust heat utilisation circuit. In other words, the heat storage unit according to the invention is directly integrated in the exhaust heat utilisation circuit, as a result of which the heat storage capacity of the exhaust heat utilisation circuit as a whole can be significantly increased. Because of this there is the possibility, among others, of feeding heat of the exhaust heat utilisation circuit during a cold start of the combustion engine to the evaporator, for example via the working medium, and to transfer heat via the evaporator to the exhaust gas flowing through the evaporator. Thus, the components of the exhaust system arranged in the exhaust line downstream of the evaporator can be heated up, for example in order to more rapidly reach an operating temperature during the cold starting phase.

Through the integration of the heat storage unit in the exhaust heat utilisation circuit it can be achieved with a special embodiment in particular that the exhaust gas has to flow through both the evaporator as well as the heat storage unit at any time. Because of this, the exhaust gas back pressure in the exhaust system can be significantly reduced, which increases the energetic efficiency of the combustion engine.

According to an advantageous embodiment, the heat storage unit can be connected to the exhaust heat utilisation circuit via an advance and a return. Thus it is possible to charge the heat storage unit as a function of the heat available in the working medium or to carry out heating of the working medium via the heat storage unit as a function of the heat requirement of the working medium. Practically, an advance valve device can be provided for controlling the advance. Additionally or alternatively, a return valve device can be provided for controlling the return.

Particularly practically, the advance is connected to the exhaust heat utilisation circuit between the evaporator and the expansion machine so that hot, superheated, vaporous working medium can be used for charging the heat storage unit. Practically, the return is connected to the exhaust heat utilisation circuit between the expansion machine and the condenser. In this case, the heat storage unit is completely arranged on the vapour side of the exhaust heat utilisation circuit, which simplifies the integration.

According to an advantageous embodiment, a condenser bypass for bypassing the condenser can be provided, which on the one hand is connected to the exhaust heat utilisation circuit between the expansion machine and the condenser and on the other hand between the condenser and the delivery device. By way of this condenser bypass, the condenser can be bypassed in the event that heat is to be transferred into the exhaust gas via the evaporator, which condenser represents a heat sink within the exhaust heat utilisation circuit. During this operating state, in which heat is transferred from the exhaust heat utilisation circuit to the exhaust gas of the exhaust system, the evaporator serves as heat sink of the exhaust heat utilisation circuit. Practically, a bypass valve for controlling the condenser bypass can be provided. Particularly practical in this case is an embodiment, in which the bypass valve is integrated in the previously mentioned return valve device. This produces a particularly compact design.

With another advantageous embodiment, the condenser can be coupled to a cooling circuit in a heat-transferring manner, which in addition is coupled to a combustion engine in a heat-transferring manner, which combustion engine generates the exhaust gas for supplying the evaporator. In this case, it is additionally possible in the event that during a cold starting phase the combustion engine is to be additionally brought up to operating temperature more rapidly, to feed heat to the cooling circuit via the condenser, so that the combustion engine can be heated up via the cooling circuit.

According to another advantageous embodiment, an evaporator bypass for bypassing the evaporator on the exhaust gas side can be provided. Thus it is possible for operating phases, in which the exhaust heat utilisation device is not required, to reduce the exhaust gas back pressure by bypassing the evaporator.

With another advantageous embodiment, the heating storage unit is configured as latent heat storage unit, which operates with a phase change material. Through the targeted selection of the composition of the respective phase change material, a desired phase change temperature can be set which is particularly suitable for the respective usage. Particularly advantageous is an embodiment, wherein a pressure adjusting device for adjusting the pressure in the phase change material is provided. By changing the pressure in the phase change material the phase change temperature can be varied and thus the storage capability.

With another embodiment, a pressure adjusting device for adjusting the pressure in the working medium can be provided. Because of this it is possible, in particular, to adjust the pressure in the working medium for operating states, in which the exhaust heat utilisation circuit is utilised for heating up the exhaust gas, that for this operating state the vapour phase is temporarily eliminated, so that only liquid working medium circulates throughout the exhaust heat utilisation circuit. Because of this, the heat transfer improves significantly.

With another advantageous embodiment, a pressure storage unit can be provided, which in particular can also serve for stocking the working medium. With the help of the pressure storage unit, pressure fluctuations in the working medium can be better cushioned. The pressure storage unit can be configured as vapour-gas storage unit and be connected to the exhaust heat utilisation circuit on its gas side. The pressure storage unit can be likewise configured as liquid-gas storage unit or as hydropneumatic pressure storage unit, which is practically arranged on the liquid side of the exhaust heat utilisation circuit and connected to the latter. Practically, the pressure storage unit can be integrated in the heat storage unit.

With another advantageous embodiment, the heat storage unit can be integrated in the evaporator. In other words, in this case the evaporator is configured as heat storage unit. Because of this, the evaporator is given an additional functionality. At the same time, a high functional density with compact design is obtained. According to a particularly advantageous embodiment it is possible hereby to integrate the heat storage unit in the evaporator so that the heat storage unit can be directly supplied by the exhaust gas. Practically, separate paths for exhaust gas and working medium can then be provided within the heat storage unit, which are coupled to the heat storage material of the heat storage unit in a heat-transferring manner. Practically, exhaust gas path and working medium path are each coupled to the heat storage medium in a heat-transferring manner. Furthermore, exhaust gas path and working medium path can also be coupled to each other in a heat transferring manner.

According to an advantageous embodiment, the evaporator bypass already mentioned above can be integrated in the evaporator, which additionally increases the functional density of the evaporator. In the case that the heat storage unit is integrated in the evaporator, and that the heat storage unit is additionally integrated in the exhaust gas path, the evaporator bypass can be arranged in particular so that it also bypasses the heat storage unit on the exhaust gas side.

Practically, the evaporator can have a housing containing a heat transfer block. This heat transfer block can couple a working medium path and an exhaust gas path with each other in a heat-transferring manner. Within the housing, the evaporator bypass is connected to the exhaust gas path upstream and downstream of the heat transfer block.

With heat storage units that are integrated in the evaporator, the previously mentioned heat transfer block can comprise an evaporator section and a heat storage section. In the evaporator section, the exhaust gas path is then coupled to the working medium path in a heat-transferring manner. In the heat storage section, the exhaust gas path and the working medium path are practically coupled in a heat-transferring manner to a heat storage material of the heat storage unit. The evaporator bypass can be arranged so that it only bypasses the evaporator section or that it bypasses both the evaporator section as well as the heat storage section. In particular, a valve device with suitable interconnection, connecting and disconnecting of the heat storage section to or from the bypass or from the exhaust gas line can be provided.

Alternatively to the latent heat storage unit preferred here, other heat storage units can also be used in principle. For example, a chemical heat storage unit can also be used. A chemical heat storage unit is based on the principle of dissolving a chemical bond between a plurality of substances under the effect of heat. During this endothermic reaction, heat is thus absorbed, i.e. stored. With corresponding selection of the substances, this endothermic reaction can be reversible, wherein during the reverse reaction, during which the previously separated substances re-combine, the previously employed heat can be liberated again, i.e. passed on. This exothermic reverse reaction can thus be utilised for providing heat. For the storage of the heat, a spatial or physical separation of the reagents, i.e. of the previously mentioned substances separated from one another during the forward reaction practically takes place. For the reverse reaction, the substances or the reagents are re-combined.

According to an advantageous operating method according to the invention introduced here, at least a part flow of the working medium can be conducted through the heat storage unit for charging the heat storage unit. During a cold starting phase of the combustion engine, heat can now be taken from the heat storage unit and fed to the combustion engine via the condenser and via the cooling circuit. In addition or alternatively, heat can be taken from the heat storage unit generally for increasing the temperature of the exhaust gas, i.e. in particular during any heat requirement phase, as for example during a cold starting phase of the combustion engine and fed to the exhaust gas via the evaporator. The temperature increase of the exhaust gas can also be carried out for example during a part load operation or during a stop and go operation of the combustion engine, if the exhaust gas temperature is no longer adequate to provide the operating temperatures of exhaust gas cleaning components.

With another practical embodiment of the operating method, the heat storage unit can be connected to the exhaust heat utilisation circuit subject to bypassing the expansion machine on the one hand between the evaporator and the expansion machine and on the other hand between the expansion machine and the condenser. For increasing the temperature of the exhaust gas, heat can now be taken from the heat storage unit and fed to the exhaust gas via the evaporator, wherein to this end the delivery direction of the delivery device is reversed. Through this measure, extremely short line lengths between heat storage unit and evaporator are obtained, which favours the heat introduction into the exhaust gas.

Further important features and advantages of the invention are obtained from the subclaims, from the drawings and from the associated Figure description by means of the drawings.

It is to be understood that the features mentioned above and still to be explained in the following cannot only be used in the respective combination stated, but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

It shows, in each schematically.

DETAILED DESCRIPTION OF THE INVENTION

Figure 1:
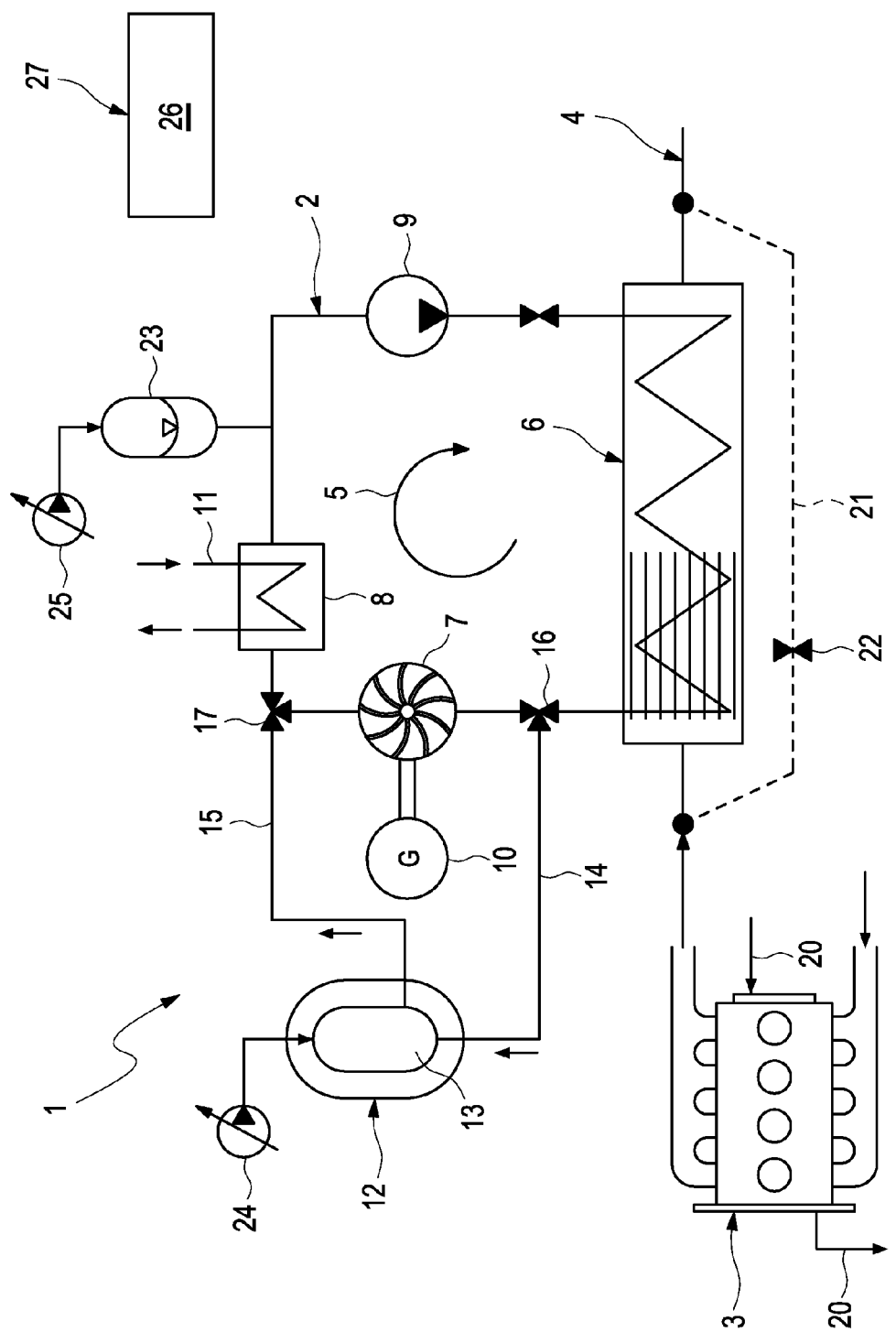
FIGS. 1 and 2 each a highly simplified schematic representation of a combustion engine with an exhaust heat utilisation device with different embodiments in the manner of a circuit diagram, FIG. 3 a highly simplified schematic representation of an evaporator of the exhaust heat utilisation device with a special embodiment in the manner of a circuit diagram.
Figure 2:
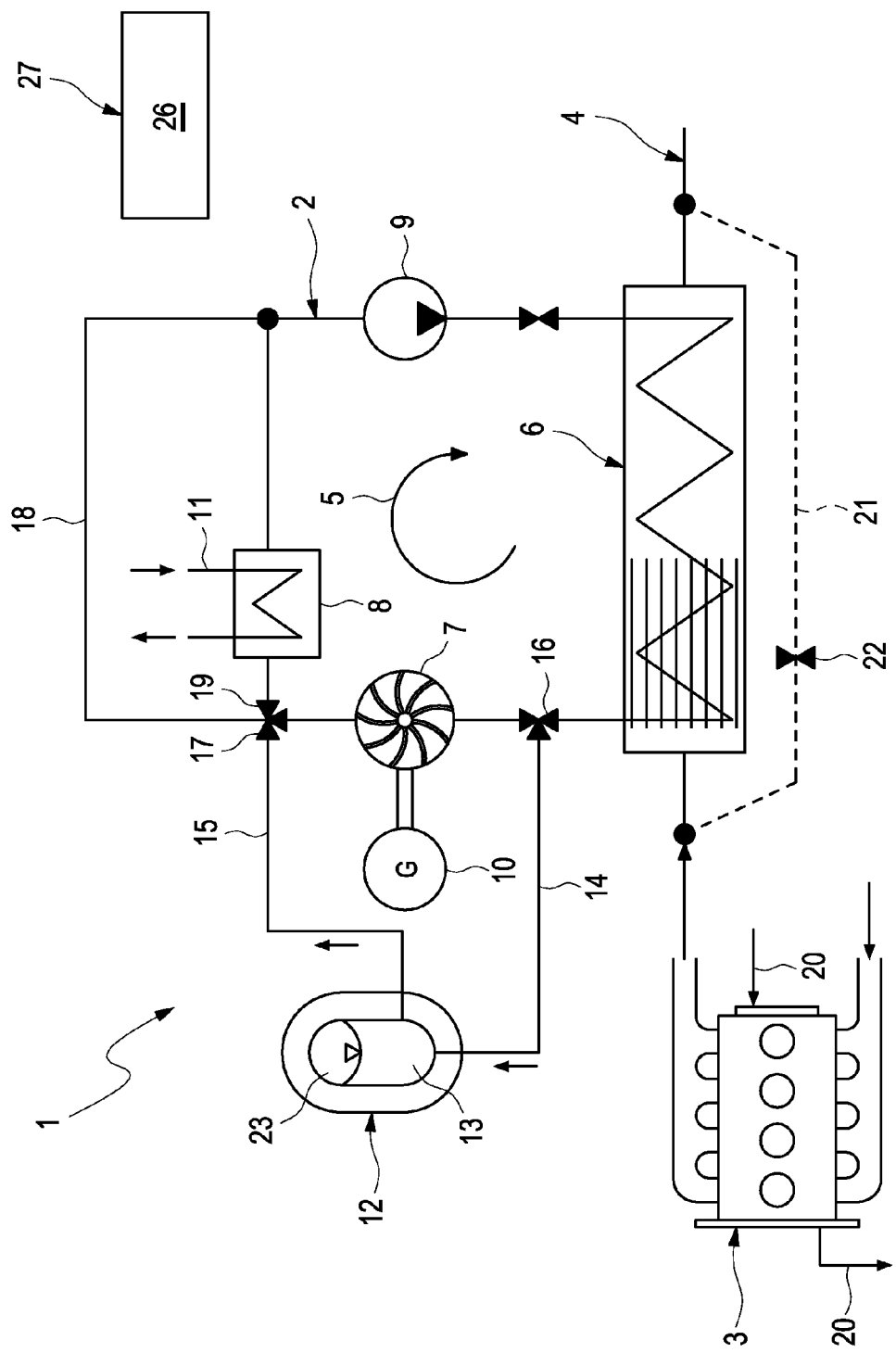

According to FIGS. 1 and 2, an exhaust heat utilisation device 1 comprises an exhaust heat utilisation circuit 2, which is coupled to a combustion engine 3 in a heat-transferring manner. The combustion engine 3 to this end comprises an exhaust gas line 4.

In the exhaust heat utilisation circuit 2 there circulates a working medium corresponding to a direction of rotation arrow 5, provided the exhaust heat utilisation device 1 operates correctly. With respect to the flow direction of the working medium, the exhaust heat utilisation circuit 2 comprises an evaporator 6, an expansion machine 7, a condenser 8 and a pump or delivery device 9 one after the other. The evaporator 6 serves for evaporating the working medium. The expansion machine 7 serves for expanding the working medium, wherein the expansion machine 7 in this case for example drives a generator 10. The condenser 8 serves for condensing the working medium, for the purpose of which the condenser 8 is connected for example to a cooling circuit 11. The pump or delivery device 9 serves for driving the working medium in the exhaust heat utilisation circuit 2.

The evaporator 6 is designed as heat transfer device and incorporated in the exhaust gas line 4 so that the evaporator 6 can be supplied with exhaust gas of the combustion engine 3.

The exhaust heat utilisation device 1 is additionally equipped with a heat storage unit 12, which is incorporated in the exhaust heat utilisation circuit 2 in such a manner that it can be supplied by the working medium. In other words, a heat storage material 13 of the heat storage device 12 is coupled to the working medium in a heat-transferring manner so that heat can be exchanged between the working medium and the heat storage unit medium 13.

With the embodiments of FIGS. 1 and 2, the heat storage unit 12 is connected to the exhaust heat utilisation circuit 2 via an advance 14 and a return 15. In the example, an advance valve device 16 and a return valve device 17 are provided, via which in each case the flow of working medium through the heat storage unit 12 can be controlled. Here, the advance valve device 16 controls the advance 14, while the return valve device 17 controls the return 15. Practically, the advance 14 is connected to the exhaust heat utilisation circuit 2 between the evaporator 6 and the expansion machine 7, so that super heated, vaporous working medium can be utilised for charging the heat storage unit 12. The return 15 is practically connected to the exhaust heat utilisation circuit 2 between the expansion machine 7 and the condenser 8. Thus, the heat storage unit 12 remains on a vapour side of the exhaust heat utilisation circuit 2, which extends in the flow direction of the working medium from the evaporator 6 as far as to the condenser 8. In contrast with this, a liquid side of the exhaust heat utilisation circuit 2 extends in the flow direction of the working medium from the condenser 8 as far as to the evaporator 6.

With the embodiment shown in FIG. 2, a condenser bypass 18 is provided, which bypasses the condenser 8 within the exhaust heat utilisation circuit 2. The condenser bypass 18 to this end is connected to the exhaust heat utilisation circuit 2 on the one hand between the expansion machine 7 and the condenser 8 and between the condenser 8 and the delivery device 9 on the other hand. For controlling the condenser bypass 18, a bypass valve 19 can be provided, which in this case is integrated in the return valve device 17.

The cooling circuit 11 provided for cooling the condenser 9 can be coupled to the combustion engine 3 in a heat-transferring manner according to an advantageous embodiment. In particular, the cooling circuit 11 is thus a part of an engine cooling circuit 20 that is shown only partially here.

Furthermore, an evaporator bypass 21 is provided with the embodiments of the FIGS. 1 and 2 shown here, which bypasses the evaporator 6 on the exhaust gas side. For controlling this evaporator bypass 21, a suitable bypass valve 22 can be provided.

The embodiment of the exhaust heat utilisation device 1 shown in FIG. 1 is additionally equipped with a pressure storage unit 23, which is connected to the liquid side of the exhaust heat utilisation circuit 3. In the example, the pressure storage unit 23 is connected to the exhaust heat utilisation circuit 2 between condenser 8 and delivery device 9. In particular, such a pressure storage unit 23 can also be integrated in the heat storage unit 12, which is indicated in FIG. 2. In this case, the heat storage unit 23 is located on the vapour side of the exhaust heat utilisation circuit 2.

The heat storage unit 12 is practically configured as latent heat storage unit. The heat storage material 13 is then practically a phase change material. In FIG. 1, a pressure adjusting device 24 is indicated, with the help of which the pressure in the phase change material, i.e. in the heat storage material 13 can be adjusted. By changing the pressure in the phase change material, the phase change temperature can be varied. Because of this, the heat storage unit 12 can adapt particularly easily to the current heat situation of the exhaust heat utilisation device 1 or the combustion engine 3.

Likewise indicated in FIG. 1 is an (other) pressure adjusting device 25, with the help of which the pressure in the working medium of the exhaust heat utilisation circuit 2 can be adjusted. During a normal operation of the exhaust heat utilisation circuit 2 the pressure in the working medium can be adjusted on the one hand by way of the delivery device 9 and on the other hand by way of the expansion machine 7. In special operating states, such as can be the case for example during a heating-up phase of the combustion engine 3, it can be practical to change the pressure in the working medium, for example in order to reduce the component of the vapour side in the exhaust heat utilisation circuit 2. It can be practical, in particular, to temporarily remove the vapour side in the exhaust heat utilisation circuit 2 completely in order to merely deliver liquid working medium, which substantially improves the heat transfer between heat storage unit 12 and exhaust gas.

For operating the exhaust heat utilisation device 1 or for actuation the adjustable components of the exhaust heat utilisation device 1 or of the combustion engine 3 a control 26 can be additionally provided. This control 26 as hardware can be integrated in a control unit 27 of the combustion engine 3 and/or implemented in the control unit 27 as software.

Figure 3:
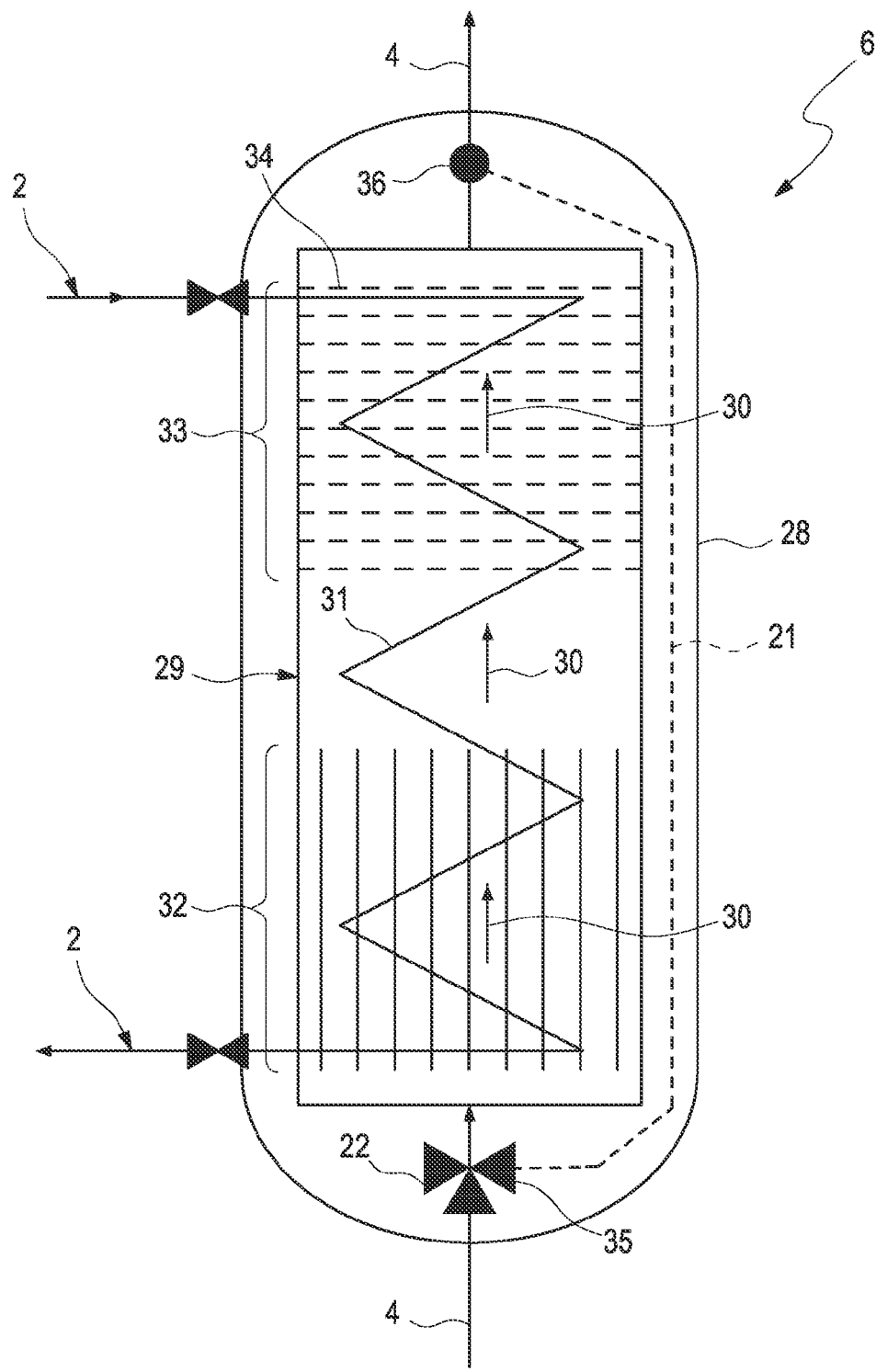

According to FIG. 3, the evaporator 6 according to a special embodiment can comprise a housing 28, in which a heat transfer block 29 is arranged. The heat transfer block 29 has an exhaust gas path 30 indicated by arrows, a working medium path 31, an evaporator section 32 indicated by a brace and a heat storage section 33 likewise indicated by a brace. In the evaporator section 32, the exhaust gas path 30 and the working medium path 31 are coupled to one another in a heat-transferring manner. In the heat storage section 33, the exhaust gas path 30 and the working medium path 31 are coupled to the heat storage material 13 in a heat-transferring manner, which is accommodated in a heat storage structure 34 within the heat storage section 33. Practically, exhaust gas path 30 and working medium path 31 can also be coupled to each other within the heat storage section 33 in a heat-transferring manner.

With the embodiment shown in FIG. 3, evaporator section 32 and heat storage section 33 are axially adjacent to one another with respect to a longitudinal direction of the heat transfer block 29. An integrated design is likewise conceivable.

In the example of FIG. 3, the previously mentioned evaporator bypass 21 is additionally integrated in the evaporator 6 in such a manner that the evaporator bypass 21 runs within the housing 28. The evaporator bypass 21 in this case is connected to the exhaust gas path 30 upstream of the heat transfer block 29 via a first connection 35 and connected to the exhaust gas path 30 downstream of the heat transfer block 29 via a second connection 36. The bypass valve 22 for controlling the evaporator bypass 21 is shown in FIG. 3 at connection 35, but can for example be integrated in connection 36.

The control 26 can be practically configured or programmed in such a manner that it can carry out the method for operating the combustion engine 3 or the exhaust heat utilisation device 1 described in the following.

During a normal operation of the combustion engine 3, the aim is also a normal operation of the exhaust heat utilisation device 1, during which exhaust heat carried along in the exhaust gas is used in the evaporator 6 for evaporating the working medium, wherein the evaporated working medium is utilised in the expansion machine 7 for driving the generator 10. The condensing of the expanded and partially cooled working medium then takes place by way of the condenser 8. The delivery device 9 again drives the working medium through the evaporator 6. During this normal operation, heat for charging the heat storage unit 12 is thus also available. This is practically carried out in that a part flow of the working medium is conducted through the heat storage unit 12.

If a temperature increase of the exhaust gas is now to be carried out, for example in order to bring a component of the exhaust system arranged downstream of the evaporator 6 in the exhaust gas line 4 to a predefined operating temperature, heat can be taken from the heat storage unit 12 and fed to the exhaust gas via the evaporator 6. To this end, the condenser 8, for example according to FIG. 2, can be temporarily bypassed via the condenser bypass 18 in order to feed hot working medium to the evaporator 6.

If however, according to the embodiment shown in FIG. 1, no such condenser bypass 18 is provided, the cooling circuit 11 for example can be temporarily deactivated. It is likewise possible to temporarily reverse the delivery direction of the delivery device 9 in order to deliver hot working medium from the heat storage unit 12 to the evaporator 6 by as short as possible a route.

Such a temperature increase of the exhaust gas is desirable in particular when the combustion engine 3 is cold-started and accordingly, passes through a cold starting phase at first. A cold start is present when the combustion engine 3 is substantially at ambient temperature.

During this cold starting phase, heat from the heat storage unit 12 can be delivered to the evaporator 6 via the working medium as described before and fed to the exhaust gas via the evaporator 6 in order to bring the exhaust gas treatment components up to operating temperature more rapidly.

It is additionally possible, during this cold starting phase, to feed heat to the combustion engine 3 via the cooling circuit 11, provided the cooling circuit 11 is a part of the engine cooling circuit 20. In the case that a condenser bypass 18 is provided, this is deactivated in that case.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An exhaust gas heat utilisation device for a combustion engine of a vehicle, comprising:
   an exhaust heat utilisation circuit, in which a working medium circulates,
   an expansion machine arranged in the exhaust heat utilisation circuit downstream of the evaporator for expanding the working medium,
   a condenser arranged in the exhaust heat utilisation circuit downstream of the expansion machine for condensing the working medium,
   a pump arranged in the exhaust heat utilisation circuit downstream of the condenser for driving the working medium in the exhaust heat utilisation circuit, and
   a heat storage unit,
   wherein the heat storage unit is incorporated in the exhaust heat utilisation circuit and is supplied thermal energy by the working medium, and also supplies thermal energy to the exhaust gas via the working medium;
   an evaporator housing containing a heat transfer block having an evaporator section and a heat storage section, the heat storage section having a heat storage structure;
   wherein the evaporator housing is configured to receive a flow of exhaust gas from the combustion engine, and further configured to receive a flow of the working medium;
   wherein, in the evaporator section, the exhaust gas is coupled to the working medium in a heat-transferring manner, and in the heat storage section, the exhaust gas and the working medium are coupled in a heat-transferring manner to a heat storage material of the heat storage structure;
   an evaporator bypass disposed within the evaporator housing, the evaporator bypass configured to direct the flow of exhaust gas such that it bypasses the evaporator section; and
   wherein the heat storage structure is positioned downstream of the evaporator section such that the exhaust gas flows through the evaporator section before flowing through the heat storage unit.

2. The exhaust heat utilisation device according to claim 1, wherein the heat storage unit is connected to the exhaust heat utilisation circuit via an advance line and a return line, and further comprising, an advance valve for controlling the advance line or a return valve for controlling the return line.

3. The exhaust heat utilisation device according to claim 2, wherein the advance line is connected to the exhaust heat utilisation circuit between the evaporator housing and the expansion machine, wherein the return line is connected to the exhaust heat utilisation circuit between the expansion machine and the condenser.

4. The exhaust heat utilisation device according claim 1, further comprising, a condenser bypass for bypassing the condenser, which the condenser bypass is connected to the exhaust heat utilisation circuit between the expansion machine and the condenser and is connected between the condenser and the pump, wherein the condenser bypass further comprises, a bypass valve for controlling the condenser bypass.

5. The exhaust heat utilisation device according to claim 1, wherein the condenser is coupled to a cooling circuit in a heat-transferring manner, the cooling circuit being additionally coupled to the combustion engine in a heat-transferring manner, wherein the combustion engine generates the exhaust gas for supplying the evaporator housing.

6. The exhaust heat utilisation device according to claim 1, wherein the heat storage unit is configured as latent heat storage unit, which operates with a phase change material, and
   a pressure adjusting device for adjusting the pressure in the phase change material is provided, and
   a pressure adjusting device for adjusting the pressure in the working medium is provided.

7. A method for operating a combustion engine of a motor vehicle, which is equipped with a exhaust heat utilisation device according to claim 1, comprising:
   charging the heat storage unit;
   wherein the step of charging comprises at least one part flow of the working medium being conducted through the heat storage unit.

8. The method according to claim 7, further comprising taking heat from the heat storage unit and feeding the heat to the combustion engine via the condenser and via the cooling circuit, during a cold starting phase of the combustion engine.

9. The method according to claim 7, further comprising the step of increasing the temperature of the exhaust gas;
   wherein, in the step of increasing the temperature, heat is taken from the heat storage unit and fed to the exhaust gas via the evaporator.

10. The method according to claim 7, wherein the heat storage unit configured to bypass the expansion machine which is connected to the exhaust heat utilisation circuit between the evaporator housing and the expansion machine and on the other hand between the expansion machine and the condenser, wherein for increasing the temperature of the exhaust gas heat is taken from the heat storage unit and fed to the exhaust via the evaporator housing, when the pump is reversed.

* * * * *